Patented Feb. 22, 1944

2,342,522

UNITED STATES PATENT OFFICE 2,342,522

ELECTRICAL INSULATION

Kenneth H. Barnard, Andover, Mass., assignor to Pacific Mills, Lawrence, Mass., a corporation of Massachusetts No Drawing. Application March 11, 1939, Serial No. 261,301

2 Claims. (Cl. 117—56)

This invention relates to electrical insulation and has as its primary object the provision of a new method of manufacturing an insulating fabric and specifically a cotton cambric fabric having an exceptionally high electrical resistance and low power factor.

Cotton fabric is used extensively for the insulation of electrical conductors both in the form of sheets and tapes. While cotton is sometimes used for insulation purposes without the addition of an insulating varnish or compound, for most purposes the sheets are impregnated or coated with some varnish or compound.

In the manufacture of so-called cambric tape which has a smooth surface finish, the fabric is first filled with starch and calendered and then is coated with a suitable varnish. Such tapes are extensively used in the insulation of high tension power conductors.

While the various insulating varnishes add to the electrical resistance of the tape, the resistance of the cloth is a vital factor. Ordinary insulating cambric may have a resistance of one thousand ohms per centimeter cube tested and measured as explained hereinbelow.

In the manufacture of cambric tapes the ordinary cotton fabric is singed to remove the projecting surface fibres prior to the application of the starch and varnish as otherwise the ends of these fibres would extend through the starch and varnish to the surface of the tape and impair the electrical insulation thereof due to the poorer resistance of the cambric.

I have discovered a method of treating cotton fabric by which the insulation thereof is remarkably increased, from 30 to 100 times, over the resistance of the ordinary fabric as used for insulation as tested in the manner explained hereinafter.

My cambric is an entirely new article of manufacture and is substantially non-conducting, especially as compared with cambric heretofore used as insulation.

I manufacture my improved cambric as follows:

Ordinary cotton gray cloth, either singed or not, as desired, is boiled with dilute caustic soda in a kier for eight hours at 15 pounds steam pressure. The cloth is then washed in ordinary water soured in dilute sulphuric acid and rinsed with water until free from acid. All this follows well-know practice.

The cloth is next washed repeatedly with distilled water of tested purity to wash out all impurities soluble in water until samples of the cloth when tested as hereinafter described show resistance of 50,000 ohms per centimeter cube or more.

A starch finish is necessary for certain purposes as in the production of cambric tape. In case a starched finish is desired suitable for coating with an insulating varnish and proper slitting, I purify the starch itself in a manner similar to that used for the cloth, for example:

I take 400 pounds of potato starch and wash it repeatedly with ordinary cold water by decantation to remove the more soluble impurities. This is followed by repeated washing with distilled water of tested purity until the last water extracts give a test of approximately 50,000 ohms per centimeter cube or more. The starch is then ready for use after the supernatent liquid is decanted off, and is boiled up with distilled water, using from 25 to 100 pounds of the purified starch per hundred gallons of distilled water. This purified starch mix is applied to the purified cloth on a mangle, followed by framing to width and drying in the usual manner. The cloth is finally given a highly calendered finish on a friction calender in order to get the smooth glossy surface required by the electrical trade. It can then be coated with a desirable varnish.

In testing the cloth for its electrical conductivity, or resistance, a 10 gram sample of the fabric is boiled for 5 minutes in a clean glass flask with 100 c. c. of "conductivity" water having a resistance of around 300,000 ohms per centimeter cube. That is to say, "conductivity" water is water distilled under conditions to remove electrically conducting constituents soluble in water therefrom and to bring it to a high electrical resistance. While the electrical resistance of the conductivity water can be increased over 300,000 ohms per centimeter cube it can only be done under very special conditions which are not necessary with the present invention.

The sample of conductivity water in which the sample of the treated fabric has been boiled is cooled to 20° C. and is measured for its electrical resistance by a Leeds & Northrup conductivity meter or similar apparatus and for the fabric prepared by the above method the resistivity of the water will be found to be about 50,000 ohms per centimeter cube. That is to say, the fabric does not impart to the water any material which seriously reduces its electrical resistance.

When ordinary cotton fabric as heretofore used for insulation purposes is tested under the same conditions it is found that the test solution has a resistivity of from 500 to 1500 ohms per centimeter cube, showing that my improved fabric has a much higher electrical resistance.

It might be stated that it is not practical to measure the electrical resistance of the fabric directly between terminals as the measurement depends upon the area of contact between the fabric and the terminals and this area of contact is so exceedingly variable that dependable results cannot be obtained and the above described method of testing has proven by experience to be the most reliable method.

It is quite probable that my method of improving the electrical insulation by washing the fabric in distilled high resistance water not only dissolves out of the fibres the water-soluble electrically-conducting, or, considered from a nalternating current standpoint, electrically-absorptive salts, and the like, that the cotton plant abstracts from the soil in which it grows and which impairs the electrical resistance of the fibres, but also does not implant conducting material in the fibres as would be the case if ordinary wash water from a lake or river was used.

Not only is the dielectric break down resistance of the fabric and the tape improved but tests show that the power factor of the tape is greatly improved. Where varnished tape made from ordinary fabric has a power factor of about 4%, my improved varnished tape has a power factor of only about 2%. This is a marked improvement.

In an insulating material the power factor is the measure of the electrical losses which are represented mainly by heat generated in the insulating material. The life of an insulated cable is dependent upon the useful life of the material by which the conductor is insulated. The insulating material deteriorates mainly by heat where the material is not exposed to the weather and mechanical wear. The conductor of the cable does not ordinarily become heated to impair the insulation and hence the life of the insulation depends mainly upon the heat generated internally in the insulating material by reason of the power factor loss. Thus by halving the power factor loss by the use of my improved insulating material over the ordinary material a much longer useful life of the insulated conductor can be expected.

I claim:

1. The method of making an electric insulating fabric containing starch, which includes the step of extracting the electrically absorptive and conductive materials from the starch by steeping it in distilled high resistance water and combining the resulting starch with a fabric from which similar materials have been extracted.

2. The method of manufacturing an electric insulating material comprising a cotton fabric containing starch, which includes the steps of extracting the electrically absorptive and conductive materials from the fabric with distilled water, whereby the electrical resistance of the fabric is markedly increased, extracting the electrically absorptive and conductive materials from the starch with distilled water, whereby the electrical resistance thereof is markedly increased, and applying the treated starch to the treated fabric.

KENNETH H. BARNARD.